Figure 1:
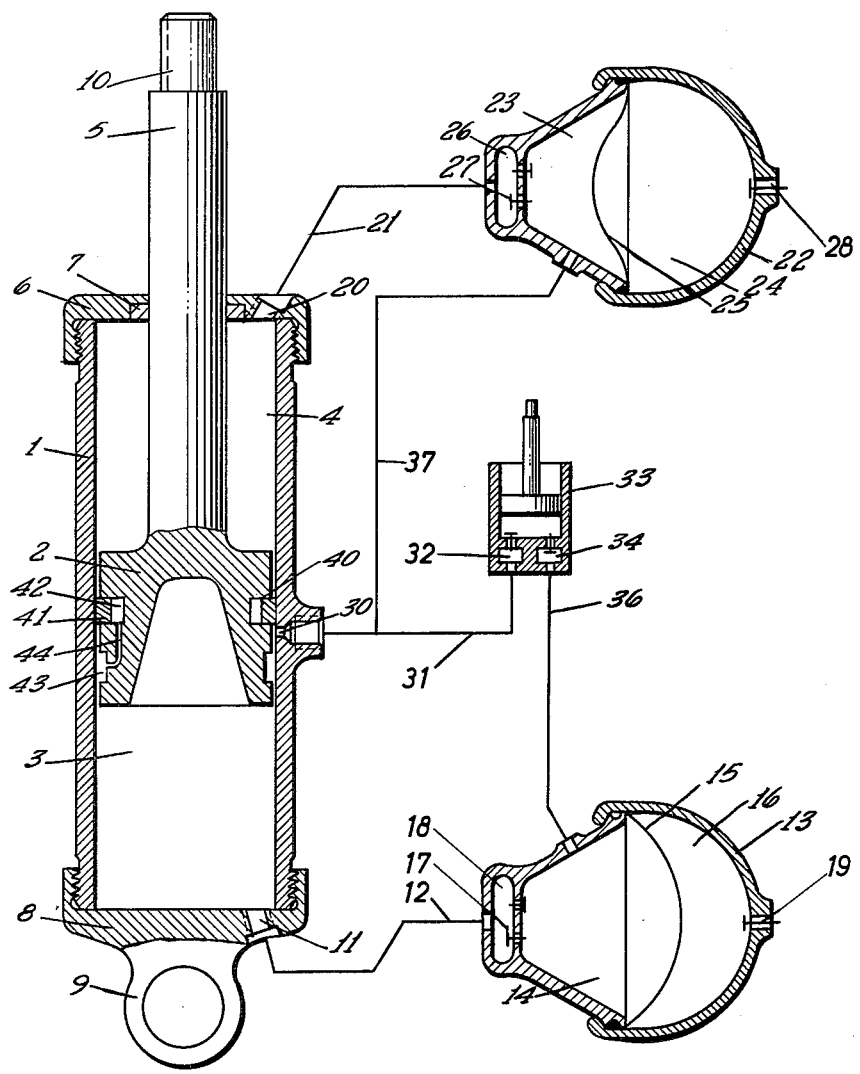

# United States Patent Office 3,222,047
Patented Dec. 7, 1965

3,222,047
SEALING ARRANGEMENT FOR PISTON OF
SUSPENSION UNIT FOR MOTOR VEHICLES
Franz Tuczek, Eitorf (Sieg), Germany, assignor to Boge
G.m.b.H., Eitorf (Sieg), Germany, a firm of Germany
Filed Aug. 12, 1963, Ser. No. 301,429
Claims priority, application Germany, Sept. 13, 1962,
B 68,831
8 Claims. (Cl. 267—64)

The present invention relates to a sealing arrangement for the working piston of an elevation-regulating hydropneumatic suspension unit for motor vehicles in which the cylinder containing the piston is divided by the piston into a high-pressure chamber and a low-pressure chamber, and in which the wall of the cylinder is provided with a control bore which controls the fluid connection between the two chambers and determines the elevation of the vehicle body from the ground.

In suspension units of the above-mentioned types the sealing ring of the working piston which separates the high-pressure and low-pressure chambers is subjected to very heavy wear due to the friction which occurs between it and the cylinder wall.

It is an object of the present invention to provide a sealing arrangement for the working piston of a suspension unit as described above which will remain in proper operation for a much greater length of time than the conventional sealing ring arrangements. The present invention is based upon the concept that the sealing means of the piston must be fully effective when the vehicle is stopped in order to avoid leakage to prevent the vehicle body from sagging downward, whereas when the vehicle is moving, a certain amount of leakage of the fluid from the high-pressure chamber to the low-pressure chamber may be permissible on the basis that the pumping effect of the piston which then occurs is sufficient to maintain the desired elevation of the vehicle body.

An aspect of the present invention resides in the provision of a hydropneumatic suspension unit in which the outer wall of the working piston is provided with a groove in which a piston ring is mounted and wherein the wall of this groove together with the inner side of the piston ring defines a closed annular chamber which communicates with a relief groove which is provided in the outer wall of the working piston and axially spaced from the piston ring facing the high pressure chamber. The relief groove is arranged to pass intermittently over the control bore in the cylinder wall during the operation of the vehicle. By means of this arrangement it is possible to relieve the annular chamber behind the piston ring regularly of the pressure which prevails in the high-pressure chamber. The contact pressure of the piston ring against the cylinder wall is thereby reduced considerably so that the wear on this ring is also reduced accordingly. When the vehicle is stopped and stays stationary, the full pressure of the high-pressure chamber will be built up in the chamber behind the piston ring so that the latter will be pressed tightly against the inner wall of the cylinder.

Another aspect of the present invention resides in the provision of a hydraulic suspension unit as above described in which the outer wall of the working piston is divided so as to form two separate parts, namely, a guide element which is slidable with considerable radial play within the cylinder and a separate sealing element which is slidable with a very small radial play within the cylinder and contains the groove for receiving the piston ring as well as the relief groove. These two parts of the piston are resiliently connected to each other. A piston of this design has the advantage that it may be easily produced and that the piston part itself as well as its sealing element may be fitted with very little play into the cylinder, while the guide element of the piston may have considerable play in the cylinder. Since they form two separate elements which are resiliently connected to each other, minor changes in the relative dimensions due to manufacture as well as deviations in alignment between the two parts of the piston will not have any effect upon its proper operation.

Figure 2:
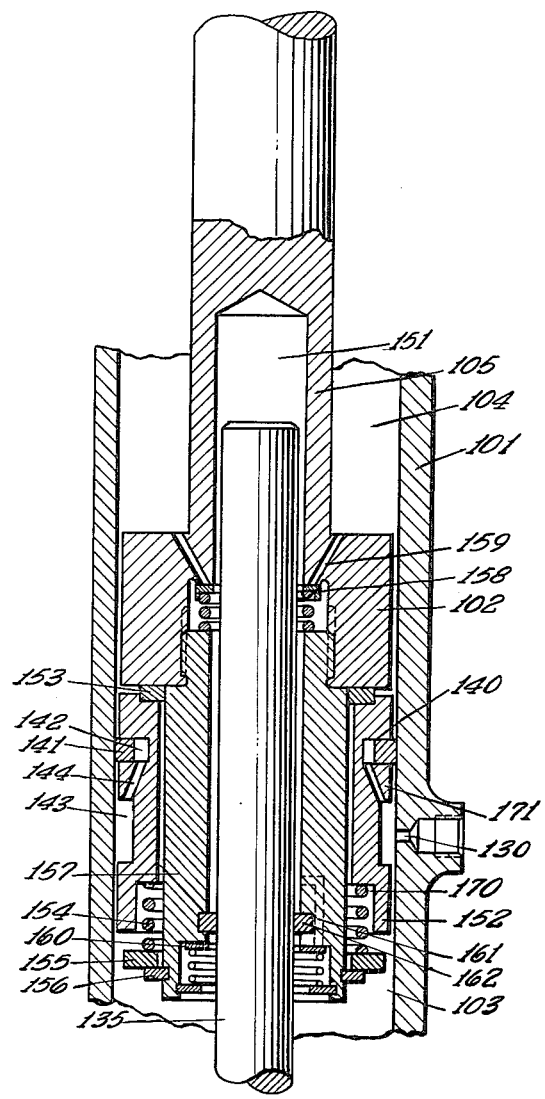

The above-mentioned as well as further features and advantages of the invention will become more clearly apparent from the following detailed description thereof which is to be read with reference to the accompanying drawings, in which FIGURE 1 shows diagrammatically and partly in section the sealing system together with the entire suspension unit according to the invention; while FIGURE 2 shows a longitudinal section of a preferred embodiment of the piston part and sealing arrangement according to the invention.

The self-pumping suspension unit as illustrated in principle in FIGURE 1 comprises a cylinder 1 which is divided by the piston 2 into a high-pressure chamber 3 and a low-pressure chamber 4. The piston rod 5 of piston 2 extends through the cylinder cover 6 which is sealed by a packing 7 relative to the piston rod 5. The high-pressure chamber 3 of the cylinder is closed by a bottom cover 8 with an eye 9 thereon which like the threaded end 10 of piston rod 5 serves for mounting the suspension unit. The high-pressure chamber 3 is connected by a connecting bore 11 and a line 12 to a high-pressure reservoir 13, the fluid chamber 14 of which is separated by a diaphragm 15 from the gas chamber 16. Between line 12 and the fluid chamber 14 the high-pressure reservoir 13 is further provided with a valve chamber 17 which contains conventional throttle valves 18 for the purpose of damping vibrations. The gas chamber 16 of reservoir 13 is closed by a filling valve 19. The low-pressure chamber 4 of the suspension unit is connected by a connecting bore 20 in the cylinder cover 6 and a line 21 to a low-pressure reservoir 22 which contains a fluid chamber 23 and a gas chamber 24 which are separated from each other by a diaphragm 25. A valve chamber 26 in the low-pressure reservoir 22 between line 21 and fluid chamber 23 is also provided with conventional throttle valves 27 for the purpose of damping vibrations. Gas chamber 24 of the low-pressure reservoir 22 is closed by a filling valve 28. Cylinder 1 is provided with a control bore 30 which is connected by a line 37 to the fluid chamber 23 of the low-pressure reservoir 22 and by a line 31 to the suction chamber 32 of a piston pump 33 which may be operated in any desired manner, for example, by the engine of the vehicle. The pressure line 36 leads from pressure chamber 34 of pump 33 to the fluid chamber 14 of the high-pressure reservoir 13. Piston 2 is provided with an annular groove 40 in which a piston ring 41 is mounted in a manner so that both flanks of the piston ring are in engagement with the walls of groove 40 and a closed annular chamber 42 is thereby formed behind piston ring 41 which is connected by channels 44 to a relief groove 43 in piston 2.

When the suspension unit is in operation, fluid is supplied by the piston pump 33 from the low-pressure reservoir 4 to the high-pressure chamber 3. When piston 2 is moved in the direction of the low-pressure chamber 4 so as to open the control bore 30, fluid flows back from the high-pressure chamber 3 through line 37 and 21 to the low-pressure chamber 4. Piston 2 normally assumes a central position in cylinder 1 which determines the level of the vehicle body. Whenever the relief groove 43 is in juxtaposition with the control bore 30, the annular chamber 42 is likewise connected through channel 44 to the low-pressure end of the system so that the pressure acting upon the piston ring 41 is intermittently relieved. As a result thereof, the piston ring is only temporarily acted upon by a higher pressure than that which prevails in low-pressure chamber 4.

When the pump action terminates, the leakage around the piston 2 results in a return flow of fluid from the high-pressure chamber 3 back into the low-pressure chamber 4 until piston ring 41 covers the control bore 30. Thereupon, the pressure which prevails in the high-pressure chamber 3 is built up in the annular chamber 42 via the relief groove 43 and channel 44. Piston ring 41 which tightly engages the side walls of groove 40 is then pressed against the wall of cylinder 1 so that no oil can pass from one pressure chamber of the cylinder to the other and the normal elevation of the vehicle body while standing still remains the same.

FIGURE 2 illustrates a preferred embodiment of the suspension unit according to FIGURE 1. The cylinder 101 is divided by the piston 102 into a high-pressure chamber 103 and a low-pressure chamber 104. Piston rod 105 contains a pump chamber 151 into which the pump piston 135 penetrates which is secured to cylinder 101 in a manner not shown. Adjacent to piston 102 an annular sealing member 152 is provided which fits with a small play into cylinder 101 and is separated from piston 102 by a resilient gasket 153. Sealing member 152 is pressed against piston 102 by a spring 154 the other end of which acts through a washer 155 and a snap ring 156 upon a sleeve 157 through which the pump piston 135 extends and which is screwed into piston 102. The suction valve 158 of the pump is connected by channels 159 is the low pressure chamber 104. During the pressure stroke of the pump piston, the pressure valve 160 of the pump opens the connection between pump chamber 151 and the high-pressure chamber 103 through the channels 161. Gasket 162 seals the pump chamber 151 relative to the high-pressure chamber 103.

In the operation of the suspension unit according to FIGURE 2, the relative movement between pump piston 135 and piston 102 results in the delivery of fluid from the low-pressure chamber 104 into the high-pressure chamber 103 until piston 102 assumes a central position in cylinder 101 which determines the elevation of the vehicle body. Piston 102 then oscillates about this central position in which the quantity of fluid which is conducted from the low-pressure chamber 104 into the high-pressure chamber 103 is equal to the quantity which is discharged from the high-pressure chamber through the control bore 130. The narrow gap 170 between sealing member 152 and cylinder 101 prevents pressure from being built up in the relief groove 143 when the latter is located within the range of the control bore 130, as illustrated in FIGURE 2, so that the annular chamber 142 will be relieved of the pressure of the high-pressure chamber 103 and the piston ring 141 will not be pressed against the cylinder wall.

When the vehicle is stationary and the pumping action has thus stopped, fluid will flow from the high-pressure chamber into the low-pressure chamber for such a length of time until the piston ring 141 covers and seals the control bore 130. Since the relief groove 143 does then no longer communicate with the control bore 130, the fluid pressure is built up in groove 143 which prevails in the high-pressure chamber 103 and through channels 144 also in the annular chamber 142. The narrow gap 171 between the sealing member 152 and cylinder 101 has a pressure gradient from the relief groove 143 to the piston ring 141 which as the result of the higher pressure in the annular chamber 142 is pressed into sealing engagement against the wall of cylinder 101. The vehicle body can therefore not sag relative to the axis of the vehicle.

Errors in alignment remain without effect since there is a relatively large clearance between piston 102 forming a guide element and cylinder 101. Due to the resilience of gasket 153 and spring 154, sealing member 152 although fitting tightly into cylinder 101 can yield relative to its guide element, i.e., piston 102 and is therefore able to slide along cylinder 101 even if it is not accurately in alignment with the piston.

Piston rings 41 and 141 are preferably endless and consist of materials which have good sliding and sealing properties and permit radial expansion and contraction, for example, of "Vulkollan" or rubber.

Although my invention has been illustrated and described with reference to the preferred embodiment thereof, I wish to have it understood that it is in no way limited to the details of such embodiments, but is capable of numerous modifictaions within the scope of the appended claims.

Having thus fully disclosed my invention, what I claim is:

1. A hydropneumatic suspension device for motor vehicles comprising, in combination: a cylinder having piston means reciprocable therein dividing said cylinder into a high pressure and low pressure fluid chamber, said piston means having first and second axially spaced and circumferentially arranged annular grooves and a fluid passageway provided therebetween; a piston ring seated within radially outward portions of said first groove engaging the wall of said cylinder for sealingly separating said chambers; and said cylinder having a fluid pressure relief port associated with fluid pressure control means, said port being located for periodic juxtaposition with said second groove to relieve the fluid pressure in said first groove when said motor vehicle is in motion.

2. A hydropneumatic suspension device according to claim 1, wherein said piston ring is effective to seal said port and thereby separate said fluid pressure relief port from said chambers when said motor vehicle is stationary.

3. A hydropenumatic suspension device for motor vehicles comprising, in combination: a cylinder having piston means reciprocable therein dividing said cylinder into a high pressure and low pressure fluid chamber, said piston means having first and second axially spaced annular grooves and a fluid passageway arranged therebetween; a piston ring resiliently seated within radially outward portions of said first groove engaging the wall of said cylinder for sealingly separating said chambers; said first groove of said piston having a predetermined radial depth for forming an annular chamber inwardly behind said ring, said annular chamber being connected to said passageway; and said cylinder having a fluid pressure relief port associated with fluid pressure control means, said port being located for periodic juxtaposition with said second groove to relieve the fluid pressure in said annular chamber when said motor vehicle is in motion.

4. A hydropneumatic suspension device for motor vehicles comprising, in combination: a cylinder having a fluid pressure relief port associated with fluid pressure control means, said port being located substantially near the axial center of said cylinder; a longitudinally extending piston reciprocably disposed within said cylinder dividing said cylinder into a high pressure and low pressure fluid chamber, said piston having first and second annular grooves formed around the outer periphery thereof coaxial to the axis of said cylinder and spaced relative to each other, said grooves being connected by a fluid passageway arranged therebetween; a piston ring located for seating against a cushion of fluid within radially outward portions of said first groove and engaging the wall of said cylinder for sealingly separating said chambers; said first groove of said piston having a predetermined radial depth for forming an annular chamber inwardly behind said ring, said annular chamber being connected to said passageway; said fluid pressure relief port being located to effect periodic juxtaposition with said second groove to control the fluid pressure of said fluid cushion.

5. A hydropneumatic suspension device according to claim 1, wherein said piston means includes a guiding portion and a seal carrying portion substantially coaxially mounted relative to the former portion; and means for resiliently connecting said portions.

6. A hydropneumatic suspension device according to claim 5, wherein said grooves are located on said seal carrying portion.

7. A hydropneumatic suspension device according to claim 6, wherein said means for resiliently connecting said portions includes a resilient sealing member interposed between said portions; and spring means acting upon said seal carrying portion and biasing it against said guiding portion.

8. A hydropneumatic suspension device according to claim 6, wherein one of said portions has a sliding fit and the other portion a comparatively loose fit relative to the wall of said cylinder.

References Cited by the Examiner

UNITED STATES PATENTS

| | | |
|---|---|---|
| 1,522,243 | 1/1925 | Hughes. |
| 1,546,455 | 7/1925 | Pritchett _____ 92—182 |
| 2,464,112 | 3/1949 | Arnold _____ 91—402 |
| 2,677,933 | 5/1954 | Hopkinson _____ 91—402 |

FOREIGN PATENTS

| | | |
|---|---|---|
| 17,553 | 9/1901 | Great Britain. |
| 511,546 | 8/1939 | Great Britain. |

OTHER REFERENCES

Tuczek: German application 1,057,891, printed May 21, 1959.

ARTHUR L. LA POINT, *Primary Examiner.*

FRED E. ENGELTHALER, *Examiner.*